United States Patent
Lachine et al.

(10) Patent No.: US 7,379,626 B2
(45) Date of Patent: May 27, 2008

(54) EDGE ADAPTIVE IMAGE EXPANSION AND ENHANCEMENT SYSTEM AND METHOD

(75) Inventors: Vladimir Lachine, Toronto (CA); Gregory Lionel Smith, Toronto (CA); Louie Lee, Richmond Hill (CA)

(73) Assignee: Silicon Optix Inc., San Jose, CA (US)

( * ) Notice: Subject to any disclaimer, the term of this patent is extended or adjusted under 35 U.S.C. 154(b) by 825 days.

(21) Appl. No.: 10/922,328

(22) Filed: Aug. 20, 2004

(65) Prior Publication Data

US 2006/0039590 A1    Feb. 23, 2006

(51) Int. Cl.
    G06K 9/32    (2006.01)
(52) U.S. Cl. .................. 382/300; 382/266; 382/298; 382/299; 345/611; 345/660
(58) Field of Classification Search ............... 382/254, 382/266, 268, 269, 275, 293, 298, 299, 300; 345/611, 660; 348/441, 445, 746, 747
    See application file for complete search history.

(56) References Cited

U.S. PATENT DOCUMENTS

| | | | |
|---|---|---|---|
| 5,526,446 A * | 6/1996 | Adelson et al. ............. | 382/275 |
| 5,602,934 A | 2/1997 | Li et al. | |
| 5,875,268 A * | 2/1999 | Miyake ....................... | 382/276 |
| 5,883,476 A | 3/1999 | Noguchi et al. | |
| 5,929,918 A | 7/1999 | Marques Pereira et al. | |
| 5,991,463 A | 11/1999 | Greggain et al. | |
| 5,991,464 A | 11/1999 | Hsu et al. | |
| 6,133,957 A * | 10/2000 | Campbell ................... | 348/458 |
| 6,490,374 B2 | 12/2002 | Puetter et al. | |
| 7,054,507 B1 * | 5/2006 | Bradley et al. ............. | 382/300 |
| 2002/0015508 A1 * | 2/2002 | Hannigan et al. ........... | 382/100 |
| 2002/0030762 A1 * | 3/2002 | Kishimoto ................... | 348/625 |
| 2006/0045384 A1 * | 3/2006 | De Haan ..................... | 382/299 |

OTHER PUBLICATIONS

Battiato, S., G. Gallo, and F. Stanco. "Smart Interpolation by Anisotropic Diffusion." 12th International Conference on Image Analysis and Processing (ICIAP'03) (2003): 572.*
The following two notices (1) & (2) are PCT notices in the corresponding PCT Application No. PCT/US04/27083.
(1) International Search Report.
(2) Written Opinion of the International Searching Authority.

* cited by examiner

Primary Examiner—Bhavesh M. Mehta
Assistant Examiner—Michael A Newman
(74) Attorney, Agent, or Firm—Sughrue Mion, PLLC (57) ABSTRACT

An edge adaptive system and method for image filtering. The method maps each output pixel onto input image coordinates and then prefilters and resamples the input image pixels around this point to reduce noise and adjust the scale corresponding to a particular operation. Then the edge in the input image is detected based on local and average signal variances in the input pixels. According to the edge detection parameters, including orientation, anisotropy and variance strength, the method determines a footprint and frequency response for the interpolation of the output pixel. In a more particular implementation, the method divides the input pixel space into a finite number of directions called skews, and estimates the edge orientation with the nearest skew direction. This further facilitates pixels inclusion in the interpolation of the output pixel.

26 Claims, 7 Drawing Sheets

EDGE ADAPTIVE IMAGE EXPANSION AND ENHANCEMENT SYSTEM AND METHOD

FIELD OF THE INVENTION

The present invention relates to filtering methods in digital image data processing, and in particular, edge adaptive filtering for expansion and enhancement of digital image data.

BACKGROUND OF THE INVENTION

A digital image is basically a two-dimensional array of digital data with each entry representing a pixel of the digitized image. Each pixel data can have a few components like color, e.g. red, green, and blue. A crucial image processing operation is expanding an image by an arbitrary factor and thereby creating an enlarged image. Deinterlacing is an example of such an operation where a video field is enlarged in vertical direction with a 1:2 scale factor. It is well known that in creating an enlarged image from an original image, it is necessary to interpolate between pixels of the original digital data array to achieve a high quality output image. Some prior art methods for image expansion interpolate the horizontal and vertical dimensions of the digitized image separately. These methods generate noticeable artifacts in the expanded images. The worst two types of resulting artifacts are zigzags (also called "jaggies") and the blurring effects. Most zigzag and blurring effects occur along the edges, substantially affecting the perceived quality of expanded edges.

It is known in the art that edge adaptive interpolation, i.e., interpolation along the edges in a digital image produces better quality results over interpolation across the edges of the image.

U.S. Pat. No. 5,991,664, to Hsu et. al., discloses a system for enhancing the resolution of a video image with classification and adaptive interpolation modules. The classification module generates a dominant orientation parameter for each original image pixel, and the adaptive interpolation module reads the dominant orientation parameter and selects one of the pre-determinant parametric coefficient sets responsive to generate each target image pixel.

U.S. Pat. No. 5,991,463 to Greggain et al. discloses a method of generating an upsampled target pixel, positioned between two lines of input source data. First, the difference in values of pixels of the digital source data in a region surrounding the upsampled target pixel to be generated in a number of directions are calculated and examined to detect an interpolation direction. Then, intermediate pixels between pixels on line segments of the input image are generated based on determined interpolation directions. And then, interpolations between the intermediate pixels are performed to generate the upsampled target pixel.

U.S. Pat. No. 6,133,957 to Campbell discloses an adaptive diagonal interpolation method for image resolution enhancement that consists of interpolation direction detection by analysis of a weighted combination of a vertical direction and a best-choice diagonal direction. An interpolation circuit then generates a target pixel by interpolating neighborhood pixels that are along a direction represented by interpolation direction signal.

U.S. Pat. No. 5,929,918 to Pereira et al. discloses an edge-oriented intra-field/inter-field interpolation filter for improved quality video appliances comprising four circuits. The first circuit detects an image edge. The second circuit uses output from the first circuit to generate a first signal corresponding to an average of the discrete image elements along a direction of the image edge. The third circuit uses output from the first circuit to detect a texture image area and for generating a second signal depending on a degree of existence of the image edge. The fourth circuit generates an output signal by combining the first signal with the third signal in a proportion dependent upon the second signal.

However, these and other prior art systems do not provide a high degree of adaptivity. The edge detection modules in prior art usually generate a direction of an edge but do not provide parameters describing the certainty of the edge, which can control the adaptive filter for better image quality. These systems are not adaptive to a certain edge scale. They usually exploit simple bilinear or bicubic interpolations that restrict the quality of the generated image. Therefore, there is a need for an improved interpolation system and method to support more flexible edge orientation and scale adaptive image enlargement and enhancement.

SUMMARY OF THE INVENTION

The present invention in one aspect provides a method for expanding and enhancing input digital image data having an input coordinate space, and producing output digital image data having an output coordinate space with certain resolution and shape, by applying adaptive edge interpolation to an output pixel, said method comprising:
  (a) obtaining the input digital image data;
  (b) mapping the output pixel coordinates onto the input coordinate space obtained in (a);
  (c) selecting a block of M×N input pixels around the mapped point of (b) wherein the shape and size of said block is determined based on a required edge resolution;
  (d) applying horizontal and vertical lowpass filters to the input pixels of said block to reduce noise, and downsample to change the scale to adjust the aspect ratio, and to adapt to low angle edge detection;
  (e) computing local signal variance for each downsampled pixel of (d) in said block to determine signal behavior;
  (f) computing average signal variance, based on local signal variances determined in (e) in said block, to determine average signal behavior in the block;
  (g) determining orientation, anisotropy, and strength of an edge based on the average signal variance found in (f);
  (h) determining frequency response of resampling filter and its footprint in the input image at the mapped position determined in (b), based on orientation, anisotropy, and strength of the edge determined in (g); and
  (i) determining the value of the output pixel via resampling in the footprint found in (h) according to the frequency response of (h).

The present invention in another aspect provides a system for expanding and enhancing input digital image data having an input coordinate space, and producing output digital image data having an output coordinate space with certain resolution and shape, by applying adaptive edge interpolation to an output pixel, said system comprising:
  (a) an interface to obtain input digital image data;
  (b) a coordinates generator to map the output pixel coordinates onto the input coordinate space;
  (c) a first footprint generator, coupled to said interface and said coordinates generator, to select a block of M×N input pixels around the mapped point, wherein the shape and size of the block is determined based on the a required edge resolution;

(d) a preprocessor, coupled to said first footprint generator, to apply horizontal and vertical lowpass filters to the input pixels of said block to reduce noise, and downsample to change the scale to adjust the aspect ratio, and to adapt to low angle edge detection;

(e) a variance calculator, coupled to said preprocessor, to compute local signal variance for each input pixel in said block to determine signal behavior;

(f) an integrator, coupled to said variance calculator, to compute average signal variance, based on local signal variances in said block, to determine average signal behavior in the block;

(g) an edge estimator, coupled to said integrator, to determine orientation, anisotropy, and strength of an edge, based on the average signal variance found by said integrator;

(h) a second footprint generator, coupled to said interface, said coordinates generator, and said edge estimator, to determine frequency response of a resampling filter and its footprint in the input image at the mapped position, based on orientation, anisotropy and strength of the edge determined by said edge estimator; and (i) a filter, coupled to said second footprint generator and said edge estimator, to determine the value of the output pixel via resampling in the footprint and according to the frequency response found by said second footprint generator.

In one example of the present invention, the AF footprint has elliptical shape with filter's coefficients generated from one-dimensional circular symmetrical profile.

In another example of the present invention, the AF footprint has a parallelogram shape with separable implementation of the 2D filter, i.e. first intermediate pixels along the edge orientation are calculated from the pixels belonging to the same rows of the footprint and then the intermediate pixels are integrated to form final interpolated output pixel's value.

In both examples the filter's coefficients are defined by edge parameters, so that softness or sharpness of the resulting image are controlled by these parameters.

Further details of different aspects and advantages of the embodiments of the invention will be revealed in the following description along with the accompanying drawings.

DETAILED DESCRIPTION OF THE INVENTION

Figure 1:
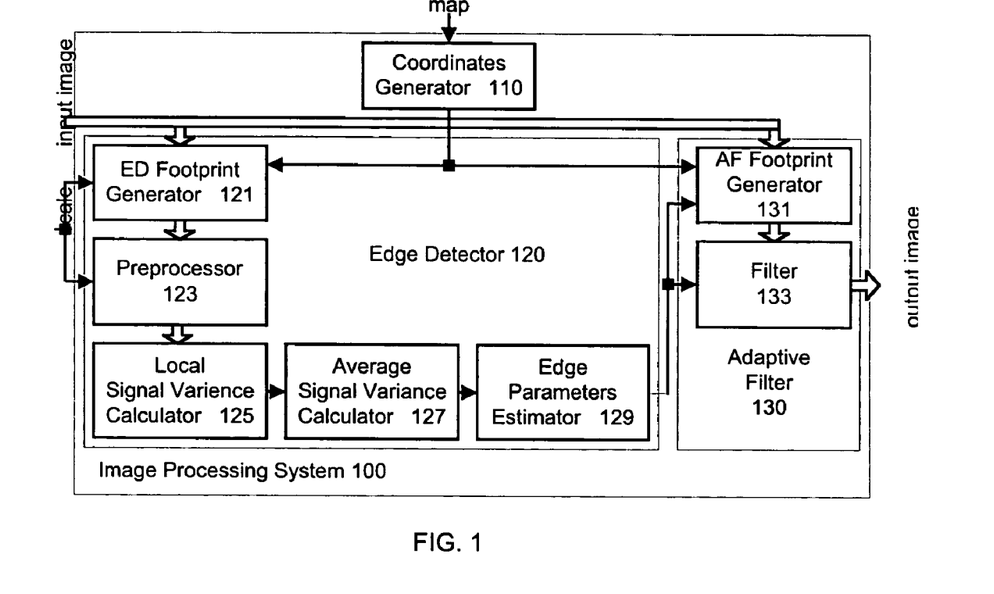
FIG. 1 represents an image processing system built according to the present invention.

Built in accordance with the present invention FIG. 1 represents an illustrated example of an image processing system 100, which uses edge adaptive filtering to achieve image expansion and enhancement. Image processing system 100 comprises coordinates generator 110, which transforms pixel coordinates from an output image space onto an input image space, edge detection (ED) footprint generator 121 for including input pixels in an edge detection computation, preprocessor 123 for prefiltering and downsampling of the input image, local signal variance calculator 125 for computing input pixel's signal variances, average signal variance calculator 127 for generating a representation of signal behavior in a vicinity of the processed output pixel, edge parameters estimator 129 for calculating edge parameters, adaptive filter (AF) footprint generator 131 for including input pixels in a final filtering, and filter 133 for calculating the output pixel.

In an example of the invention, filtering is performed by first detecting a local edge and associated parameters such as orientation, anisotropy and gradient strength, and then, adaptively filtering input pixels over a footprint based on these parameters. Accordingly, the frequency response of the filter is signal controlled. As a consequence, the method of the present invention produces a smoother and more natural output image without jagging artifacts, while maintaining the sharpness of the original edges.

Image processing system 100 starts by receiving input digital image data at coordinates generator 110. This data, for instance, could be an input frame in a progressive video signal or a field in an interlaced video signal.

Then, coordinates generator 110 maps the coordinates of an output pixel onto the input image coordinate space. This transformation can range from a straightforward scaling to a complicated warping. Mapping output coordinates onto input coordinates, or so-called inverse transformation, has many advantages known to people skilled in the art, including covering the entire output pixel space and not leaving "holes" in the output image.

Figure 2:
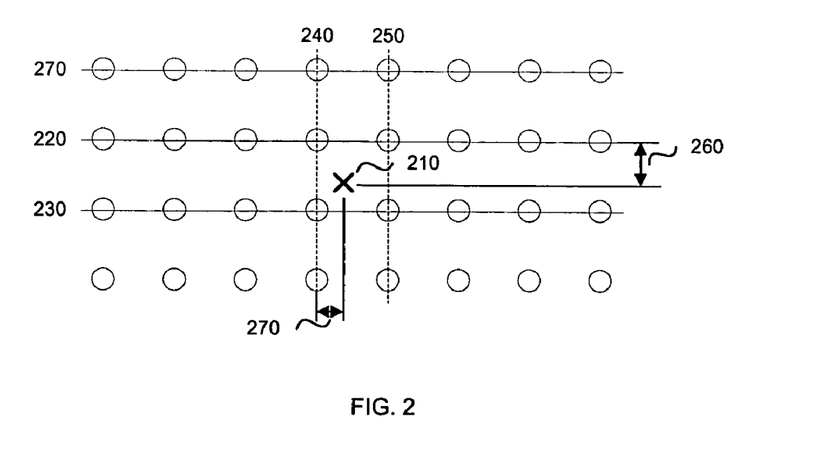
FIG. 2 represents an example of a sampling model.

The mapped position of an output pixel in the input image coordinate space is, in general, somewhere between the input pixels. In one example of the invention, adapted for deinterlacing applications, the mapped coordinates are calculated via equations $x'=O_x+xS_x$ and $y'=O_y+yS_y$, where $x',y'$ are mapped coordinates of the output pixel in the input image coordinate space, $O_x,O_y$ are the offsets relative to the leftmost input column and the topmost input line, and $S_x,S_y$ are numbers of input columns and lines corresponding to each output column and line. For zooming applications the numbers of input columns and lines are less than one. The input image is considered to consist of an array of color samples, spaced on a uniform grid as shown in FIG. 2. Each output pixel is mapped onto a sample point 210 in the input image coordinate space.

In general, the output pixel mapped position point 210 is between two input pixel rows 220 and 230, and between two input pixel columns 240 and 250. When it falls exactly on a row or column, it is considered to be infinitesimally below or to the right. The integer part of the mapped vertical coordinate is thus the index of the input line 220 above the sample point. The integer part of the mapped horizontal coordinate is the index of the column 240 to its left. The fractional parts of these coordinates, 260 and 270, determine the position of the sample point within a one-pixel square area. The position of the output, mapped point is used to find phase information for the resampling operation. It also determines which set of input pixels are to be analyzed for edge estimation for that particular output pixel.

Once the mapped coordinates in the input image space are known, ED footprint generator 121 determines a block of M×N input pixels around the mapped coordinates. This block of pixels is then used for edge detection. Generally speaking, the size and shape of the block of input pixels is a trade-off between higher image quality and computational limitation. Meanwhile, the nature of the operation, like zooming in horizontal or vertical directions, is an important factor in determining the shape of the block. Another deciding factor is the type of the application. For instance, in video applications like deinterlacing, a number of pixel lines are usually read into a buffer for the processing operations. Since these lines are read out sequentially, a natural choice for the block would be simply a number of lines. In one example of this invention used in deinterlacing applications, the system uses 4 lines of a video image.

Preprocessor 123 then prefilters and downsamples data in the block of M×N input pixels to produce an intermediate block of image data with adjusted resolution and reduced noise for the ensuing edge detection. As an example, since each frame of an interlaced video signal consists of two fields of vertically reduced resolution (e.g. by a factor of 2), the low-pass prefilter processes the luminance signal to limit its bandwidth in the horizontal direction.

Before explaining the edge detection formalism of the present invention it is necessary to distinguish edge "orientation" from edge "direction". A direction is defined over the full angle range of $2\pi$ (360°), but orientation is defined over a half angle range of $\pi$ (180°). This means that two vectors with opposite directions (angle difference of 180°) have the same orientation.

Edge detection most commonly includes three major operations: differentiation, smoothing, and labeling. Differentiation consists of evaluating the derivatives of the image. Smoothing consists of reducing noise in the image and regularizing the numerical differentiation. Labeling involves localizing edges and increasing the signal-to-noise ratio of the edge by suppressing false edges.

Local signal variance calculator 125 receives the intermediate block of image data from preprocessor 123. To detect an edge, local signal variance calculator 125 computes variances for each pixel in the intermediate block of image data. Average signal variance calculator 127 then calculates the average variance for each mapped coordinate point, based on the local signal variances. Finally, edge parameters estimator 129 determines the edge orientation, strength and anisotropy based on the average variance. The specific workings of local signal variance calculator 125, average signal variance calculator 127, and edge parameters estimator 129 will be described in more detail.

Edge detection, in one example of the present invention, is implemented via the conventionally known gradient squared tensor (GST) calculation method. First, local signal variance calculator 125 computes the horizontal and vertical gradients (intensity variations from that pixel to the adjacent pixels) for pre-processed pixels inside the intermediate block of image data. Then, local signal variance calculator 125 computes local GST values for each pixel in the block based on the calculated gradients. Average signal variance calculator 127 then averages these GSTs to attribute an averaged GST (AGST) to the mapped point in the input image space coordinates. Edge parameters estimator 129 then uses this information to find a local edge at the position of the output pixel mapped coordinates.

A vectorial representation of the local orientation is introduced as a tensor $$T = \frac{1}{\|v\|} vv^T = \frac{1}{\|v\|} \begin{pmatrix} x^2 & xy \\ xy & y^2 \end{pmatrix},$$

where $v=(x,y)^T$ is a vector along the dominant orientation and $\|v\|=\sqrt{x^2+y^2}$ is the norm of the vector v. The main advantage of the tensor representation is that it describes the orientation in a continuous way. It makes one able to use larger areas to update the certainty of the estimate, as simply as, by local averaging in a specific region.

In this example, for the case of a color image with red, green, and blue (RGB) components, local signal variance calculator 125 computes the GST by calculating gradients and corresponding tensors for each of the three color components and then averaging these tensors to obtain the GST as in the following:

$$GST = \begin{pmatrix} \sum_{i=1}^{3} (g_x^i)^2 & \sum_{i=1}^{3} (g_x^i g_y^i) \\ \sum_{i=1}^{3} g_x^i g_y^i & \sum_{i=1}^{3} (g_y^i)^2 \end{pmatrix}.$$

Alternatively, local signal variance calculator 125 converts RGB components to conventionally known YUV components (luminance and two chrominance signals) which is the color space used in the video systems Alternatively, local signal variance calculator 125 directly obtains these components and calculates gradients over the luminance component only:

$$GST = \begin{pmatrix} (g_x^Y)^2 & g_x^Y g_y^Y \\ g_x^Y g_y^Y & (g_y^Y)^2 \end{pmatrix}.$$

The latter approach is more suitable for video signal processing, which is represented by YUV components.

In one example of the present invention, local signal variance calculator 125 calculates the GST as:

$$GST = \begin{pmatrix} g_x g_x & g_x g_y \\ g_x g_y & g_y g_y \end{pmatrix},$$

where $$g_x(x, y) = \frac{\partial I(x, y)}{\partial x}$$

and $$g_y(x, y) = \frac{\partial I(x, y)}{\partial y}$$

are horizontal and vertical derivatives and I(x,y) represents the intensity of the image.

In order to reduce the probability of wrongfully detected image edges, average signal variance calculator 127 accumulates the local GSTs in the block of pixels with generally non-uniform weight coefficients $w_i$:

$$AGST = \begin{pmatrix} G_{xx} & G_{xy} \\ G_{xy} & G_{yy} \end{pmatrix} = \begin{pmatrix} \sum_{j \in W} w_j (g_x^j)^2 & \sum_{j \in W} w_j g_x^j g_y^j \\ \sum_{j \in W} w_j g_x^j g_y^j & \sum_{j \in W} w_j (g_y^j)^2 \end{pmatrix}$$

Since this tensor is quadratic in form, the tensor elements may be averaged over the block without cancellation of opposite vectors.

Edge parameters estimator 129 calculates edge parameters, which serve as control parameters for adaptive filter 130. In one example of image processing system 100, edge parameters including orientation, anisotropy, and gradient strength are calculated.

The orientation, in a more particular example of this invention, is estimated based on the AGST, using principal component analysis. The major eigenvector of the AGST corresponds to the orientation in which the gradient is the largest. The ridge-valley orientation, in which the gradient is the smallest, is perpendicular to this axis, and therefore, it is given by the shortest eigenvector. The corresponding major $\lambda_1$ and minor $\lambda_2$ eigenvalues, and edge orientation angle $\alpha$, which is the angle of the shortest eigenvector, are calculated from the following equations:

$$\lambda_1 = \frac{(G_{xx} + G_{yy}) + \sqrt{(G_{xx} - G_{yy})^2 + 4G_{xy}^2}}{2},$$

$$\lambda_2 = \frac{(G_{xx} + G_{yy}) - \sqrt{(G_{xx} - G_{yy})^2 + 4G_{xy}^2}}{2},$$

$$\alpha = \frac{L(G_{xx} - G_{yy}, 2G_{xy}) + \pi}{2},$$

where, $$L(x, y) = \begin{cases} 0, & (x = 0) \& (y = 0) \\ \pi/2, & (x = 0) \& (y > 0) \\ -\pi/2, & (x = 0) \& (y < 0) \\ \tan^{-1}(y/x), & x > 0 \\ \tan^{-1}(y/x) + \pi, & x < 0. \end{cases}$$

Anisotropy defines a certainty, or confidence level, of the edge orientation estimation. In one example of the invention, the anisotropy is measured from the ratio of difference to the sum of the two eigenvalues defined as $$A = \frac{\lambda_1 - \lambda_2}{\lambda_1 + \lambda_2} = \frac{\sqrt{(G_{xx} - G_{yy})^2 + 4G_{xy}^2}}{G_{xx} + G_{yy}}.$$

With this definition the anisotropy takes values between 0 and 1, indicating the range from completely isotropic (all orientations are equal) to perfectly anisotropic, respectively. Based on the value of the anisotropy, a corresponding threshold value switches the filtering between normal and orientation adaptive paths in this example of the invention.

Adaptive filter 130 treats edges with small gradient strength differently from the edges with large gradient strength. Comparing with a gradient strength preset threshold, adaptive filter 130 rejects an edge if the gradient strength is less than the preset threshold.

The edge parameters, generated by edge detector 120, control the frequency response of adaptive filter 130. First, AF footprint generator 131 determines a block of P×Q input pixels around the mapped coordinates calculated by coordinates generator 110. In general, these input pixels may not be the same as the ones generated by ED footprint generator 121. Filter 133 accumulates these pixels in the AF footprint with weights controlled by the edge parameters. In other words, frequency response of the filter 133 is controlled by the local edge, and thus, it is locally adapted to the particular input image neighborhood.

Figure 3:
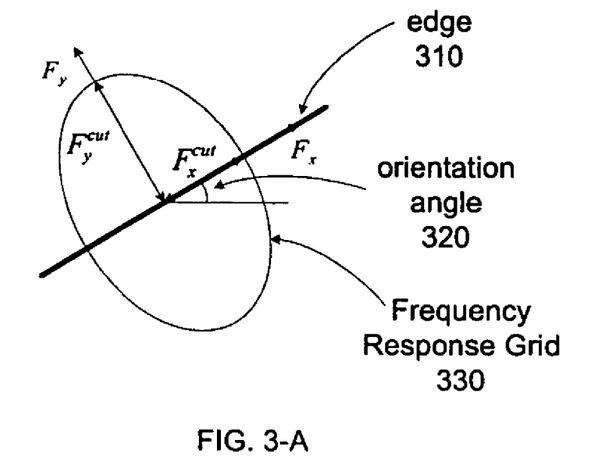
FIG. 3A represents a diagram of the frequency response of the adaptive filter for an elliptical footprint.
FIG. 3B represents a diagram of the frequency response of the adaptive filter for a skewed rectangular footprint.

In one example of the adaptive filter 130, an elliptical filter is used for signal enlargement and enhancement. The elliptical filter has an elliptical frequency response with two major cut-off frequencies: one along the edge and the other in the direction perpendicular to the edge as it is shown in FIG. 3A. Lengths of the ellipse axes are defined by the anisotropy parameter, so that sharpness of the final image is controlled by the certainty of the detected edge. This filter cannot be made Cartesian separable, but it can be implemented as a circularly symmetric one-dimensional filter with variable cut-off frequency between major and minor axes. In this example is a single-pass resampling is used without separating variables. The advantage of this example is the accuracy and greater output image quality. It is harder to implement from a hardware point of view due to the memory requirement to contain a copy of all the pixel data.

In another example of the adaptive filter 130, a parallelogram filter footprint is used for signal enlargement and enhancement. Filter 133, in this example, performs interpolation in two stages: horizontal resampling, and then interpolation along the edge orientation, amounting to a parallelogram footprint. Once more, sharpness of the final image is controlled by the certainty of the detected edge. This example of filter 133 has a two-dimensional frequency response with a parallelogram base, as it is shown in FIG. 3B. The two-pass sampling has the advantage that it is easier to implement from a hardware point of view though it might not yield the quality of an elliptical, single-pass filtering.

In yet a more particular example of this invention, designed for optimization of both the elliptical filtering and the parallelogram filtering, the input pixel space is divided up into a finite number of skew directions defined by the slope dx/dy. An edge orientation, once determined, is estimated by the nearest skew orientation. This optimization has an advantage in computational implementation as it makes pixel inclusion in the footprint much easier. With a parallelogram filter, for example, the intersection of a skew line with each input pixel row has a constant distance from the nearest input pixel. This significantly reduces the computational burden.

Figure 4:
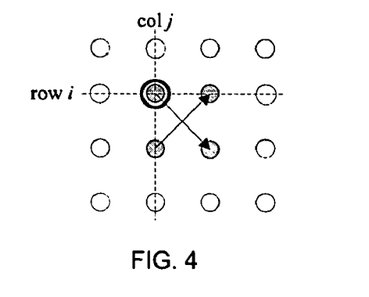
FIG. 4 represents an example of gradients calculation.

In this particular case of parallelogram filter, for each output pixel location, four pixels from the preprocessed intermediate image as shown in FIG. 4 are used to calculate the following quantities:

$$g^f_{i,j} = p_{i+1,j+1} - p_{i,j}$$
$$g^r_{i,j} = p_{i,j+1} - p_{i+1,j}$$
$$g^{ff}_{i,j} = (g^f_{i,j})^2$$
$$g^\Delta_{i,j} = \frac{1}{2}(g^f_{i,j} + g^r_{i,j})^2$$
$$g^{rr}_{i,j} = (g^r_{i,j})^2,$$

where the $p_{i,j}$ are the luminance components of the intermediate image generated by preprocessor 123. It may be subsampled horizontally and vertically. The local values $g^{ff}$, $g^\Delta$, $g^{rr}$ from the surrounding area are then averaged in an area W via the following equations:

$$G^{ff}_{i,j} = \sum_{a \in W} \sum_{b \in W} g^{ff}_{i+a,j+b},$$
$$G^\Delta_{i,j} = \sum_{a \in W} \sum_{b \in W} g^\Delta_{i+a,j+b},$$
$$G^{rr}_{i,j} = \sum_{a \in W} \sum_{b \in W} g^{rr}_{i+a,j+b}.$$

These averaged gradient values are used in the calculation of the overall gradient $$G = \frac{1}{2}(G^{ff} + G^{rr}),$$

the anisotropy $$A = \frac{\sqrt{V_x^2 + V_y^2}}{G},$$

and two quantities $V_x = G^\Delta - G$ and $$V_y = \frac{1}{2}(G^{ff} - G^{rr}).$$

Altogether they define a skew value (integer) and a low-pass filter control value (on or off).

In order for an edge to be detected, G and A must be greater than threshold values $G_{min}$ and $A_{min}$, which are adjustable. Otherwise the skew is set to zero and low-pass operation is set to off.

The value of the skew (in pixels per row) corresponding to an edge orientation is defined as:

$$\text{skew} = -R_a \tan\left(\frac{\arg(V_x + jV_y)}{2}\right),$$

where $R_a$ is a ratio of horizontal and vertical resolutions (aspect ratio) of the intermediate image at the output of preprocessor 123.

Later processing is simplified if the skew value is quantized (rounded) to one of several predetermined values. Rather than perform the calculation above, and then quantize the result, it is easier to enumerate each quantization threshold, and determine the $V_x/V_y$ ratio which produces it. Then, finding the quantized skew is a relatively simple matter of evaluating the signs of some linear functions of the form $a_k V_x + b_k V_y$. Each function is defined by the constants $a_k$, $b_k$ corresponding to a particular quantization threshold.

Assuming then that thresholds $G_{min}$ and $A_{min}$ are met, a skew value and a low-pass filter control signal are determined. The low-pass filter is always on, except when ($V_x$, $V_y$) result in skew=0. In this zone, the edge is close to vertical and no processing is applied. The output at this stage is: skew=0, lowpass=on.

In the final edge parameters estimation formalism, to avoid abrupt changes in the skew from one pixel to the next, the initial edge estimate for the current pixel is examined along with those for the two pixels to the left and right. This is called the "conditioning step". If a skew value of zero results, the lowpass control may be on or off. In either case, this decision is unaffected by the conditioning step. Otherwise a maximum skew is calculated which is the absolute value of the average of the skew values found in the previous stage for the horizontally adjacent pixels.

If the magnitude of the current pixel's skew is greater than the maximum skew value, it is unaffected by the conditioning step. If it exceeds the maximum skew, it is clipped to this value. It retains its original sign. In the case where the current pixel's skew is non-zero prior to the conditioning step, and the maximum skew is zero, the conditioned skew will be zero and lowpass control will be off. This is the only case where the low-pass control is modified by the conditioning stage.

Figure 5:
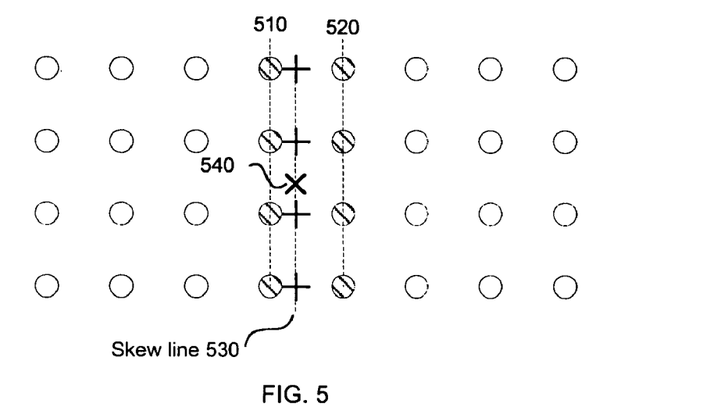
FIG. 5 represents an example of a row sampling diagram for skew=0.

FIG. 5 shows a situation when skew=0 in this example of the present invention. In this case, the sample points on each row have the same horizontal coordinate as the output sample point. Assuming 2-tap (linear) interpolation is used in the horizontal direction and 4-tap (cubic) interpolation is used in the vertical direction, the eight shaded pixels in columns 510 and 520 are used to generate the four row samples along the skew line 530 and, ultimately, the single output sample 540.

Figure 6:
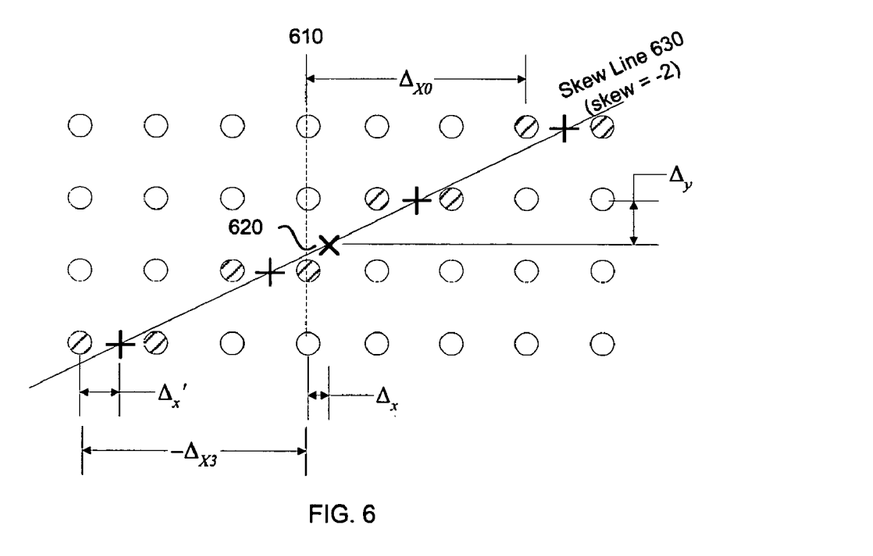
FIG. 6 represents an example of a row sampling diagram for skew=−2.

FIG. 6 shows the same output sample point as shown in FIG. 5 with skew=−2. In this case, the implementation of parallelogram filtering example of the present invention is paramount. The row sample points are derived from this simple geometric construction. Again, the shaded pixels are used to calculate the output pixel 620 around the skew line 630. The position of each row sample is described by an integer part $\Delta_{Xi}$, which is the offset from the base column 610, and is different for each of the four rows, and a fractional part $\Delta_x$, which is the same for all four rows since the skew is constrained to be an integer. In general, $$\Delta_{Xi} = \left\lfloor \Delta_x - \tau - \frac{1}{2}f - \text{skew} \cdot (\Delta_y + 1 - i) \right\rfloor$$

$$= \left\lfloor \Delta_x - \tau - \frac{1}{2}f - \text{skew} \cdot \Delta_y \right\rfloor + \text{skew} \cdot (i-1),$$

$$\Delta'_x = frac\left( \Delta_x - \tau - \frac{1}{2}f - \text{skew} \cdot \Delta_y \right)$$

where f is 0 or 1. When a low-pass mode is enabled, f=1 is used; this creates an additional a half pixel displacement to the left. The constant $\tau$ is a small adjustment discussed below.

Filter 133 in this example consists of horizontal and vertical resampling stages.

The horizontal resampling stage, in one particular implementation, is based on the conventionally known Blu-Thévenaz-Unser (BTU) 'shifted linear' interpolation method. This technique mitigates the high-frequency loss of linear interpolation by using an Infinite Impulse Response (IIR) pre-filter. The prefilter has a phase shift at low frequencies, which is compensated by shifting the sample points.

FIG. 7A shows how the BTU technique works. A new set of samples $c_n$, like new sample 720, are constructed from the input $y_n$, and then linear interpolation is performed between these new samples. The new samples are constructed so that $y_n = \tau c_{n-1} + (1-\tau) c_n$ where $\tau$ is a fixed design parameter, and 730 is an interpolated waveform.

The next step is to create output samples by linearly interpolating the $c_n$, but at a position adjusted to the left by $\tau$. When the sample point is coincident with one of the $y_n$, the original $y_n$ will be reconstructed as per the equation above. Intermediate values can exhibit overshoot, etc., roughly consistent with a higher-order filter method. This method yields high quality while significantly reducing the computation. The prefilter is defined by the recursion $$c_{-1} = 0$$

$$c_n = \frac{1}{1-\tau} y_n - \frac{\tau}{1-\tau} c_{n-1}, n \geq 0.$$

The input image samples are prefiltered as they arrive, and stored as $c_n$. So, the values operated on by the horizontal filter are actually $c_n$, not $y_n$. The horizontal sample points are shifted by $\tau$ to the left before linear interpolation.

The interpolation operates in two modes: a normal mode, which is simple linear interpolation of two adjacent $c_n$ samples; and a lowpass mode, producing a low-pass filter effect.

The normal mode is done according to the formula:

$$r_i = c_{i,k+\Delta_{Xi}} + \Delta'_x (c_{i,k+\Delta_{Xi}+1} - c_{i,k+\Delta_{Xi}}),$$

where i is a row index 0 . . . 3, $r_i$ is the row sample, k is the column index, and other symbols are as before (c now has a row subscript).

The lowpass mode uses three adjacent c values on each row. In order to select these three pixels, a ½ pixel shift to the left is incorporated in the calculation of $\Delta_{Xi}$ and $\Delta'_x$. Then the formula, $$r_i = \frac{1}{2}[c_{i,k+\Delta_{Xi}} + c_{i,k+\Delta_{Xi}+1} \Delta'_x (c_{i,k+\Delta_{Xi}+2} - c_{i,k+\Delta_{Xi}})].$$

is used.

Figure 7:
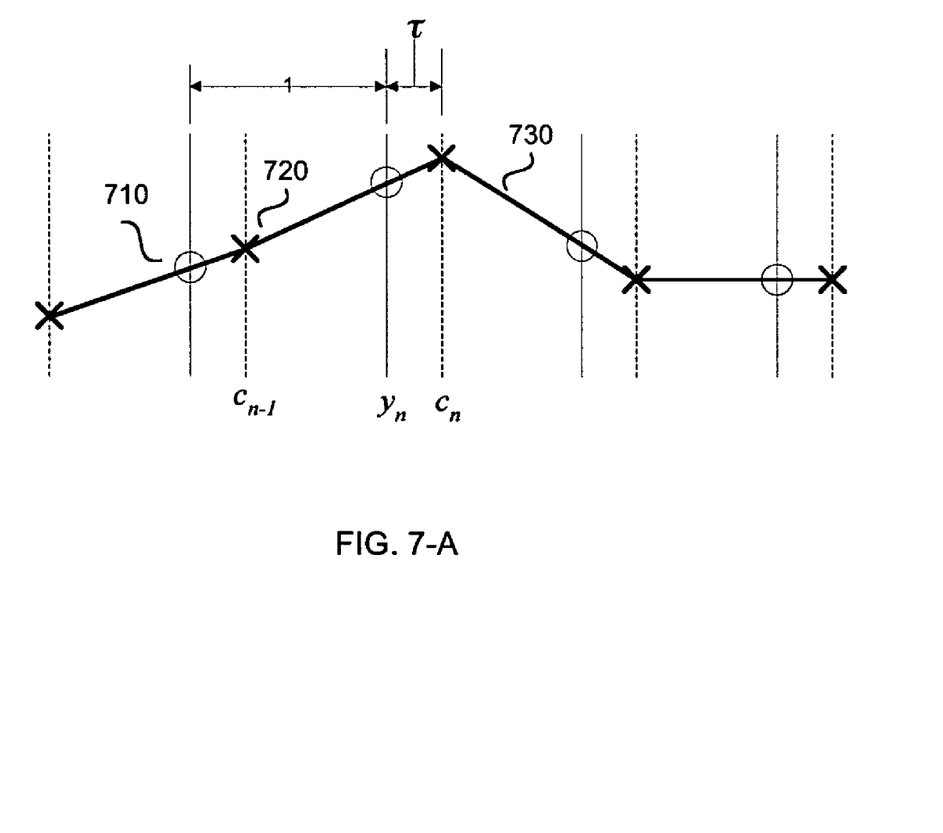
FIG. 7A represents an example of a shifted linear interpolation algorithm.
FIG. 7B represents an example of a cubic interpolation algorithm.

The vertical resampling stage of filter 133 is accomplished simply as $$p = \sum_{i=0}^{N-1} a_i(\Delta_y) r_i,$$

where p is the output pixel, and $a_i(\Delta_y)$ is a resampling filter. In a particular implementation, $\Delta_y$ is quantized, and pre-calculated values are then selected by table lookup or similar. The filter may be based on a Keys interpolator for N=4 according to FIG. 7-B as $$a_0(\Delta) = -\frac{1}{2}(1-\Delta)^2 \Delta$$

$$a_1(\Delta) = \frac{3}{2}\Delta^3 - \frac{5}{2}\Delta^2 + 1$$

$$a_2(\Delta) = a_1(1-\Delta) = -\frac{3}{2}\Delta^3 + 2\Delta^2 + \frac{1}{2}\Delta$$

$$a_3(\Delta) = a_0(1-\Delta) = -\frac{1}{2}(1-\Delta)\Delta^2.$$

FIG. 8A represents the process steps executed by image processing system 100 according to an example of the present invention. At step 801, image processing system 100 receives digital data corresponding to an input image. It may be frame or field. At step 810, the coordinates of an output pixel are mapped onto input image coordinates. Then, at step 820, a block of input M×N pixels around the mapped coordinates of the step 810 are chosen. At step 830, this pixel data is pre-processed to reduce noise, and in the meantime, to change the resolution of the input image according to the desirable scale of the edges to be detected. At step 840, for each prefiltered and downsampled pixel in the block, local signal variances are calculated. At step 842, these local signal variances are used to calculate average signal variance. At step 850, the edge parameters are determined based on average signal variance and according to these parameters, at step 860, a block of P×Q input image pixels is selected from the original input image around the mapped coordinates of step 810. The number of pixels in this block and filter's footprint shape depend on the chosen topology of the filtering and it is a trade off between desired quality of the output and computational power as explained earlier in this disclosure. At step 870, the output pixel is generated by interpolating the input pixels in the described block of P×Q pixels. The weights of the interpolation depend on the edge parameters. At step 880 the output pixel is saved into the output frame buffer.

Figure 8:
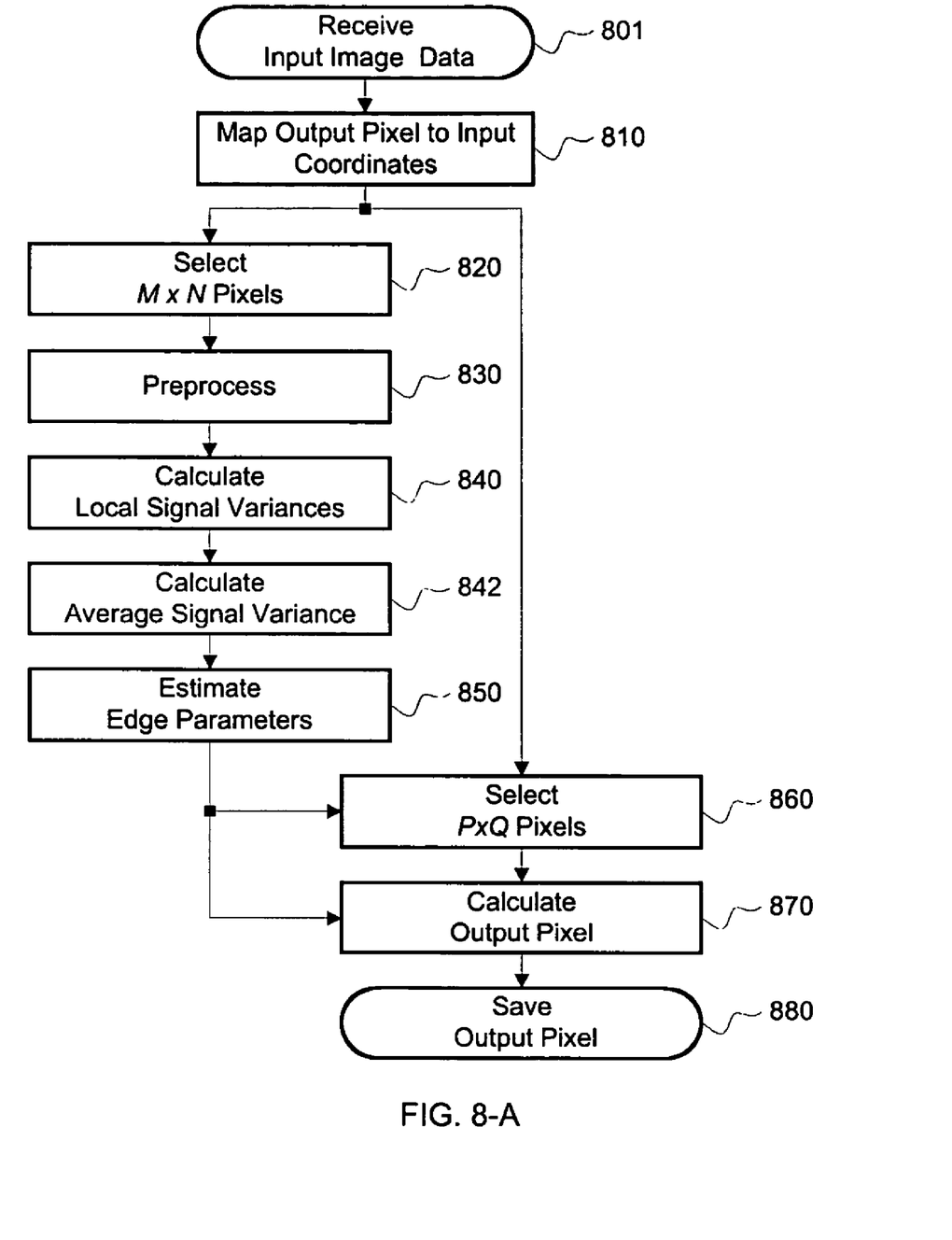
FIG. 8A represents the flow logic of an image processing system built in according to the present invention.
FIG. 8B represents the flow logic of an example of a system using gradient squared tensors for edge detection built in according to the present invention.

FIG. 8B shows the same flow logic diagram as FIG. 8-A with specific implementation of edge detector 120. In this diagram signal variances are calculated as gradient squared tensors, and filtering is implemented in two passes as in the examples explained above.

Having explained the details of the invention we now disclose some specific application of image processing system 100. One of the applications of the present invention is deinterlacing. There are two basic methods of deinterlacing. In the first method, the lines in the odd and even fields can be added together, which is known as "field weaving". In the second method, missing lines in each field are generated by interpolation without reference to the other field, which is known as "bobbing". However, it is often necessary to expand the image vertically simultaneously due to the concomitant conversion from interlaced to progressive video scan. For instance, if the input is NTSC 480i interlaced video with 720×240 resolution for each of the two fields, and the output is to appear as 720 p progressive video with 1280×720 resolution for the frame. Accordingly, the image must be scaled vertically from 240 lines per field to 720 lines per frame. Since interlaced fields are by nature undersampled in the vertical direction, normal scaling results in jaggies on the edges close to horizontal axis, which will be enlarged in the scaling operation.

Figure 9:
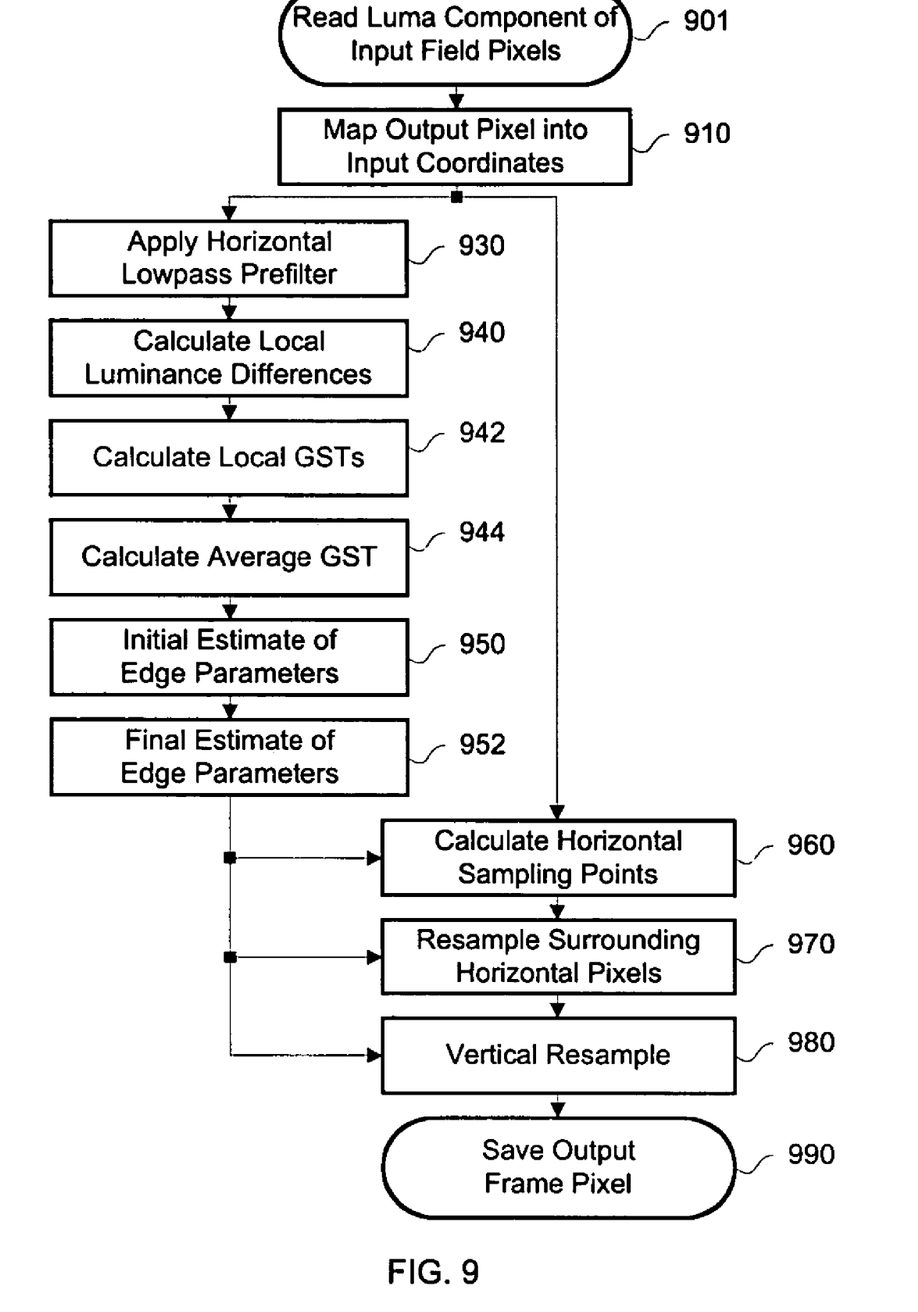
FIG. 9 represents the flow logic of a deinterlacing system built in according to the present invention.

FIG. 9 represents the flow logic of an example of image processing system 100 adapted for bobbing operations with simultaneous scaling. In this example of the present invention, image processing system 100 is used for bobbing deinterlacing with simultaneous enlargement of the video field in horizontal and vertical directions. As described above, "bobbing" is where missing lines in each field are generated by interpolation without reference to the other field. This means that a scale in vertical direction may be not just 2 as in traditional deinterlacing but any value greater or equal to 1. Image processing system 100 adapts to the any particular scale while providing edge orientation filtering.

At step 901, deinterlaced field digital data are obtained, which contain luminance and chrominance components. At step 910, an output pixel coordinates are mapped onto the input image coordinate space. At step 930, a horizontal low pass filter is applied to the luminance values of the input pixels to reduce noise and reset the scale for deinterlacing operations. At step 940, local pixel luminance differences are calculated. At step 942, based on local luminance differences, the local GST are calculated for each input pixel. At step 944, the average GST is found, based on the local GST values in a pixel block surrounding the mapped output pixel position. At step 950, an initial orientation and lowpass filter controls are determined for the output pixel position from the averaged GST. At step 952, final orientation and lowpass filter controls are determined from the initial estimate for the current output pixel and horizontally adjacent pixels. At step 960, horizontal sampling points in the pixel block are calculated. This is determined by the horizontal position and fractional vertical position, and by the skew. At step 970, based on input pixels surrounding the horizontal sampling points, intermediate samples are calculated. The results are row samples. At step 980, the row samples are combined (resampled vertically) using a 4-tap multiphase interpolation filter. The phase is selected using the fractional part of the vertical coordinate of the current sample point. Finally, at step 990, after calculating all output pixels components, an output progressive scan frame is generated.

In one particular example of the deinterlacing application, both field weaving and bobbing are used depending on the motion strength detected. First, motion is detected between pixels of the adjacent fields. If the detected motion strength is lower than a predetermined lower limit, field weaving is used to produce the missing pixels, wherein the pixels from an adjacent field are used to produce a progressive scan frame. If the detected motion strength is higher than a predetermined upper limit, field bobbing is used, wherein the missing pixels are produced by resealing and interpolating the current field. In case the motion strength lies between the two limits, the missing pixels are determined by interpolation between the two methods of bobbing and weaving according to the motion strength.

As will be apparent to those skilled in the art, various modifications and adaptations of the structure described above are possible without departing from the present invention, the scope of which is defined in the appended claims.

The invention claimed is:

1. A method for expanding and enhancing input digital image data having an input coordinate space, and producing output digital image data having an output coordinate space with certain resolution and shape, by applying adaptive edge interpolation to an output pixel, said method comprising:
   (a) obtaining the input digital image data;
   (b) mapping the output pixel coordinates onto the input coordinate space obtained in (a);
   (c) selecting a block of M×N input pixels around the mapped point of (b) wherein the shape and size of said block is determined based on a required edge resolution;
   (d) applying horizontal and vertical lowpass filters to the input pixels of said block to reduce noise, and downsample to change the scale to adjust the aspect ratio, and to adapt to low angle edge detection;
   (e) computing local signal variance for each downsampled pixel of (d) in said block to determine signal behavior;
   (f) computing average signal variance, based on local signal variances determined in (e) in said block, to determine average signal behavior in the block;
   (g) determining orientation, anisotropy, and strength of an edge based on the average signal variance found in (f);
   (h) determining frequency response of resampling filter and its footprint in the input image at the mapped position determined in (b), based on orientation, anisotropy, and strength of the edge determined in (g); and
   (i) determining the value of the output pixel via resampling in the footprint found in (h) according to the frequency response of (h).

2. The method of claim 1, wherein the average signal variance of (f) is determined via:
   I. computing horizontal and vertical gradients in each input pixel of the M×N block;
   II. computing a local gradient squared tensor for each input pixel in said block based on the local gradients of "I"; and
   III. computing an average gradient squared tensor for the block based on the local gradient tensors of "II".

3. The method of claim 1, wherein the edge orientation is estimated via:
   (A) predefining a set of slopes in the x-y plane that have the same intersection distance from the nearest pixels in each input pixel row;
   (B) characterizing these slopes with different skew line, wherein a skew line is defined as having a preset slope of dx/dy, and
   (C) approximating the actual edge orientation with the nearest skew line, to facilitated the computation of the interpolating of the output pixel by eliminating the need for computation of the intersection of the edge orientation line with an input pixel row.

4. The method of claim 1, wherein at (h) an elliptical footprint is determined based on the edge orientation with one of its major and minor axes along the edge orientation, and wherein the method uses a single pass, two-dimensional resampling filter based on an elliptical frequency response.

5. The method of claim 3, wherein an elliptical footprint is determined with one of its major and minor axes along the skew line to facilitate the computation of pixel inclusion in the filtering, and wherein the method uses a single pass, two-dimensional resampling filter based on an elliptical frequency response.

6. The method of claim 1, wherein a parallelogram footprint is determined along the edge orientation, and wherein the method uses two-pass horizontal and vertical resampling based on a parallelogram frequency response.

7. The method of claim 3, wherein a parallelogram footprint is determined along the skew direction with the skew line parting the parallelogram in half to facilitate the computation of pixel inclusion for filtering, and wherein the method uses two-pass horizontal and vertical resampling based on a parallelogram frequency response.

8. The method of claim 1, applied to convert an interlaced video input to a progressive scan video output, wherein the method increases vertical scale and interpolates missing lines in a field to produce a progressive scan video frame.

9. The method of claim 1, applied to convert an interlaced video input to a progressive scan video output via:
(I) detecting motion strength in pixels of the interlaced video fields;
(II) generating the progressive scan frame by merging pixels from two adjacent interlaced fields when the detected motion strength is lower than a predetermined lower limit;
(III) generating the progressive scan frame by resealing and interpolating a single interlaced field, using the method of claim 8, when the detected motion strength is higher than a predetermined upper limit; and
(IV) interpolating between (II) and (III) according to the motion strength, when the motion strength lies between the lower and the upper limits.

10. The method of claim 1, wherein the method uses intermediate horizontal resampling of the output pixels from the surrounding input pixels based on shifted linear interpolation, determined by shifting the value of each pixel by a certain amount along the line connecting the values of two adjacent pixels and sampling these new values instead of the original pixel values to mitigate the high frequency loss.

11. The method of claim 1, wherein the coordinates mapping in (b) is a linear scaling.

12. The method of claim 1, wherein the coordinates mapping in (b) is warping.

13. The method of claim 1, wherein the frequency response of the filter in (i) is adaptive to the strength and anisotropy of the edge found in (g), to enhance the edge details if the edge anisotropy and strength are higher than a preset limit, and to smooth the edge details if the edge anisotropy and strength are lower than a preset limit.

14. A system for expanding and enhancing input digital image data having an input coordinate space, and producing output digital image data having an output coordinate space with certain resolution and shape, by applying adaptive edge interpolation to an output pixel, said system comprising:
(a) an interface to obtain input digital image data;
(b) a coordinates generator to map the output pixel coordinates onto the input coordinate space;
(c) a first footprint generator, coupled to said interface and said coordinates generator, to select a block of M×N input pixels around the mapped point, wherein the shape and size of the block is determined based on the a required edge resolution;
(d) a preprocessor, coupled to said first footprint generator, to apply horizontal and vertical lowpass filters to the input pixels of said block to reduce noise, and downsample to change the scale to adjust the aspect ratio, and to adapt to low angle edge detection;
(e) a variance calculator, coupled to said preprocessor, to compute local signal variance for each input pixel in said block to determine signal behavior;
(f) an integrator, coupled to said variance calculator, to compute average signal variance, based on local signal variances in said block, to determine average signal behavior in the block;
(g) an edge estimator, coupled to said integrator, to determine orientation, anisotropy, and strength of an edge, based on the average signal variance found by said integrator;
(h) a second footprint generator, coupled to said interface, said coordinates generator, and said edge estimator, to determine frequency response of a resampling filter and its footprint in the input image at the mapped position, based on orientation, anisotropy and strength of the edge determined by said edge estimator; and
(i) a filter, coupled to said second footprint generator and said edge estimator, to determine the value of the output pixel via resampling in the footprint and according to the frequency response found by said second footprint generator.

15. The system of claim 14, wherein said variance calculator and said integrator are adapted to compute the average signal variance via:
I. computing horizontal and vertical gradients in each input pixel of the M×N block;
II. computing a local gradient squared tensor for each input pixel in said block based on the local gradients of "I".
III. computing an average gradient squared tensor for the block based on the local gradient tensors of "II".

16. The system of claim 14, wherein said edge estimator is adapted to perform an edge orientation estimation via:
(A) predefining a set of slopes in the x-y plane that have the same intersection distance from the nearest pixels in each input pixel row;
(B) characterizing these slopes with different skew line, wherein a skew line is defined as having a preset slope of dx/dy;
(C) approximating the actual edge orientation with the nearest skew line, to facilitated the computation of the interpolating of the output pixel by eliminating the need for computation of the intersection of the edge orientation line with an input pixel row.

17. The system of claim 14, wherein said second footprint generator is adapted to determine an elliptical footprint based on the edge orientation with one of its major and minor axes along the edge orientation, and wherein said filter is adapted to use a single pass, two-dimensional resampling based on an elliptical frequency response function.

18. The system of claim 16, wherein said second footprint generator is adapted to determine an elliptical footprint with one of its major and minor axes along the skew line to facilitate the computation of pixel inclusion in the filtering, and wherein said filter uses a single pass, two-dimensional resampling based on an elliptical frequency response function.

19. The system of claim 14, wherein said second footprint generator is adapted to determine a parallelogram footprint along the edge orientation, and wherein said filter is adapted to use two-pass horizontal and vertical resampling based on a parallelogram frequency response.

20. The system of claim 16, wherein said second footprint generator is adapted to determine a parallelogram footprint along the skew direction with the skew line parting the parallelogram in half to facilitate the computation of pixel inclusion for filtering, and wherein said filter is adapted to use two-pass horizontal and vertical resampling based on a parallelogram frequency response.

21. The system of claim 14, adapted to convert an interlaced video input to a progressive scan video output, wherein the system increases vertical scale and interpolates missing lines in a field to produce a progressive scan video frame.

22. The system of claim 14, adapted to convert an interlaced video input to a progressive scan video output via:
 (I) detecting motion strength in pixels of the interlaced video fields;
 (II) generating the progressive scan frame by merging pixels from two adjacent interlaced fields when the detected motion strength is lower than a predetermined lower limit;
 (III) generating the progressive scan frame by resealing and interpolating a single interlaced field, using the method of claim 8, when the detected motion strength is higher than a predetermined upper limit;
 (IV) interpolating between (II) and (III) according to the motion strength, when the motion strength lies between the lower and the upper limits.

23. The system of claim 14, wherein the system is adapted to perform intermediate horizontal resampling of the output pixels from the surrounding input pixels based on shifted linear interpolation, determined by shifting the value of each pixel by a certain amount along the line connecting the values of two adjacent pixels and sampling these new values instead of the original pixel values to mitigate the high frequency loss.

24. The system of claim 14, wherein said coordinate generator is adapted to perform coordinate mapping as a linear scaling.

25. The system of claim 14, wherein said coordinate generator is adapted to perform coordinate mapping as warping.

26. The system of claim 14, wherein said filter is adaptive to the strength and anisotropy of the edge, to enhance the edge details if the edge anisotropy and strength are higher than a preset limit, and to smooth the edge details if the edge anisotropy and strength are lower than a preset limit.

* * * * *